(12) United States Patent
Khalifa

(10) Patent No.: US 6,327,257 B1
(45) Date of Patent: Dec. 4, 2001

(54) CODE DIVISION MULTIPLE ACCESS TRANSMITTER AND RECEIVER

(75) Inventor: Nabil Khalifa, Le Mans (FR)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/299,527

(22) Filed: Apr. 26, 1999

(30) Foreign Application Priority Data

Apr. 30, 1998 (EP) .................................................. 98401054

(51) Int. Cl.$^7$ .................................................. H04B 7/216
(52) U.S. Cl. .................. 370/342; 375/135; 375/136; 375/142; 375/146; 375/150; 370/335
(58) Field of Search .................. 370/204, 335, 370/342, 441, 479, 206, 208, 209; 375/130, 131, 132, 133, 135, 136, 138, 140, 141, 142, 146, 147, 150, 367

(56) References Cited

U.S. PATENT DOCUMENTS

| | | | |
|---|---|---|---|
| 4,639,932 | * 1/1987 | Nakagawa | 375/130 |
| 5,128,957 | * 7/1992 | Nakagawa | 375/130 |
| 5,150,377 | * 9/1992 | Vannucci | 375/130 |
| 5,748,623 | * 5/1998 | Sawahashi et al. | 370/342 |

FOREIGN PATENT DOCUMENTS

WO 94/29970 * 12/1994 (WO) .

OTHER PUBLICATIONS

By S. Hara & R. Prasad, "Overview of Multicarrier CDMA", IEEE Communications Magazine, Dec. 1997, pp. 126–133.

* cited by examiner

*Primary Examiner*—Jean Corrielus
(74) *Attorney, Agent, or Firm*—Edward W. Goodman

(57) ABSTRACT

The input data to a CDMA transmitter is used to introduce a slight frequency offset to the clock that is used to generate the CDMA code. At the receiver, the frequency-offset CDMA signal proportionately affects the magnitude of output signals from one or more CDMA correlators. A composite signal that is based on the magnitudes of the output signals is compared to a set of predefined threshold levels to provide the demodulated output data.

4 Claims, 3 Drawing Sheets

CODE DIVISION MULTIPLE ACCESS TRANSMITTER AND RECEIVER

BACKGROUND OF THE INVENTION

1. Field of the Invention

The present invention relates to a code division multiple access transmitter comprising a modulation stage followed by an up-converter, and to a code division multiple access receiver comprising reciprocally a down converter followed by a demodulation stage. This invention may have important applications in relation with the future mobile communications standards which will use code-division multiple access modulation techniques for all types of channel.

2. Description of Related Art

Spread spectrum transmission techniques, implemented for over thirty years in the field of military communications, may also be of interest for use in mobile radio applications. According to the basic principle of these techniques, a signal is spread over a frequency bandwidth that is much wider than the minimum bandwidth required to transmit the signal. More precisely, the idea behind spread spectrum is to transform a signal with a given bandwidth into a noise-like signal of much larger bandwidth: hence the total power transmitted when a spread spectrum technique is used (this power is assumed to be the same as that in the original signal) is spread over 10 to 1000 times the original bandwidth, while its power spectral density is correspondingly reduced by the same amount. This feature gives to a spread spectrum signal the characteristic of causing little interference to a narrow-band user.

This frequency-spreading characteristic offers a transmitted signal the possibility of using CDMA (code-division multiple access), particularly in order to support simultaneous digital communication among a large community of relatively uncoordinated users. The CDMA multiplexing technique is described for instance in the document "Overview of multicarrier CDMA", by S. Hara and R. Prasad, IEEE Communications Magazine, December 1997, pp. 126–133. In fact, a CDMA system is a spread spectrum system in which, in order to share the same bandwidth, the users are assigned different spreading codes (generated by a pseudo-noise generator and determined by code parameters such as a chip length T and a code length N) in order to spread their signals over a bandwidth much wider than their transmitted data bandwidth, a specific signature sequence being assigned to each user to ensure signal separability.

BRIEF SUMMARY OF THE INVENTION

An object of the invention is to propose a CDMA transmitter based on a new principle of modulation.

To this end the invention relates to a CDMA transmitter such as defined in the preamble of the description and which is moreover characterized in that said modulation stage itself comprises in series at least a data-to-frequency offset converter, a frequency synthesizer controlled by said converter and a code generator.

In a particular embodiment of said transmitter, the code generator is periodically initialized by an initialization module by means of which at least one code period without any frequency offset is provided each P code periods.

An other object of the invention is to propose a corresponding CDMA receiver allowing to demodulate signals generated by such a CDMA transmitter.

To this end the invention relates to a CDMA receiver such as defined in the preamble of the description and which is characterized in that said demodulation stage receives a signal that has been modulated by a modulation stage, comprising at least a data-to-frequency offset converter, a frequency synthesizer controlled by said converter and a code generator, and comprises a demodulation branch and calibration branch, said demodulation branch comprising correlation means, for detecting said frequency offsets, and decision means, for yielding the corresponding demodulated data, and said calibration branch being provided for a periodical frequency control of the reference code generator of said receiver before data demodulation.

In the case the code generator of the transmitter has been periodically initialized so that at least one code period without any frequency offset is provided each P code periods, any offset detected at the receiving side can then be considered as a wrong one that does not correspond to input data.

BRIEF DESCRIPTIONS OF THE DRAWINGS

The particular aspects of the invention will now be explained with reference to the embodiment described hereinafter and considered in connection with the accompanying drawings, in which:

FIG. 1 shows a simplified architecture for a conventional direct sequence spread spectrum transmitter;

FIG. 2, that illustrates the principle of the invention, shows an original code OC and, on the upper and lower lines, two examples of frequency offset affected codes;

DETAILED DESCRIPTION OF THE INVENTION

Figure 1:
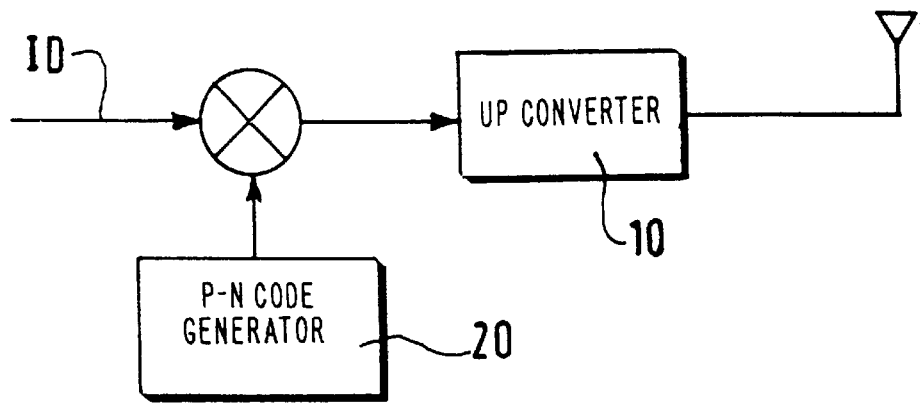

In a conventional CDMA transmitter such as shown in FIG. 1, the input data ID to be transmitted modulate, before up-conversion in an up-converter 10 and transmission, at least one pseudo-noise code period (defined by means of a pseudo-noise code generator 20) whose frequency is much higher than that of data. In the proposed CDMA transmitter, the principle according to the invention is different: the data information is contained in a frequency offset. It means that said data drive a frequency synthesizer which in turn generates the clock of the pseudo-noise code generator with a slight frequency offset, without any effect on the bandwidth. It may be highlighted that this technique is different from the well-known frequency hopping technique: in a typical frequency-hopping transmitter, a pseudo-random hopping code is used to control the output frequency of a phase-locked loop-based synthesizer, and, in the receiver, an identical copy of the hopping patterns is used to recover the FM carrier modulated with the data.

During the reception and after acquisition process (i.e. after the synchronization of the received signal with the local pseudo-noise code within one chip), for each code period a frequency offset detector stores each frequency offset, corrected by a tracking loop. Said detection is based on a correlation operation allowing to distinguish the frequency offsets. For instance, to two different frequency offsets correspond two distinct peak amplitudes detected by a correlator stage of the receiver. Thus the data demodulation can be done easily.

Figure 3:
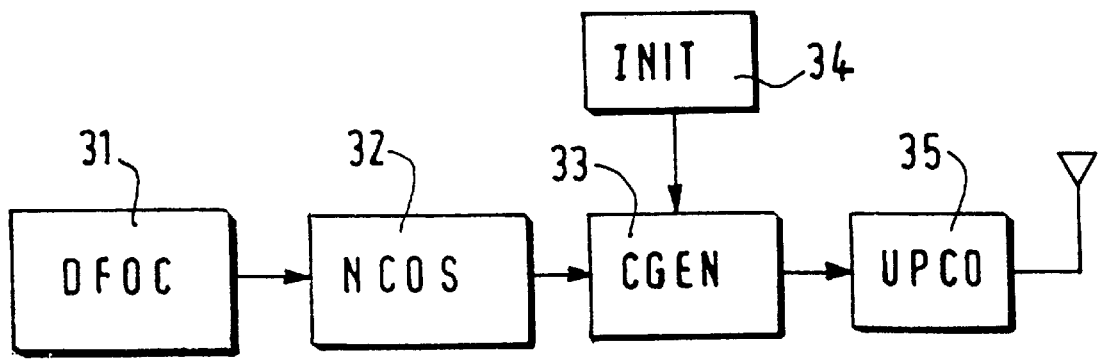
FIG. 3 shows an embodiment of a CDMA transmitter according to said invention.
Figure 2:
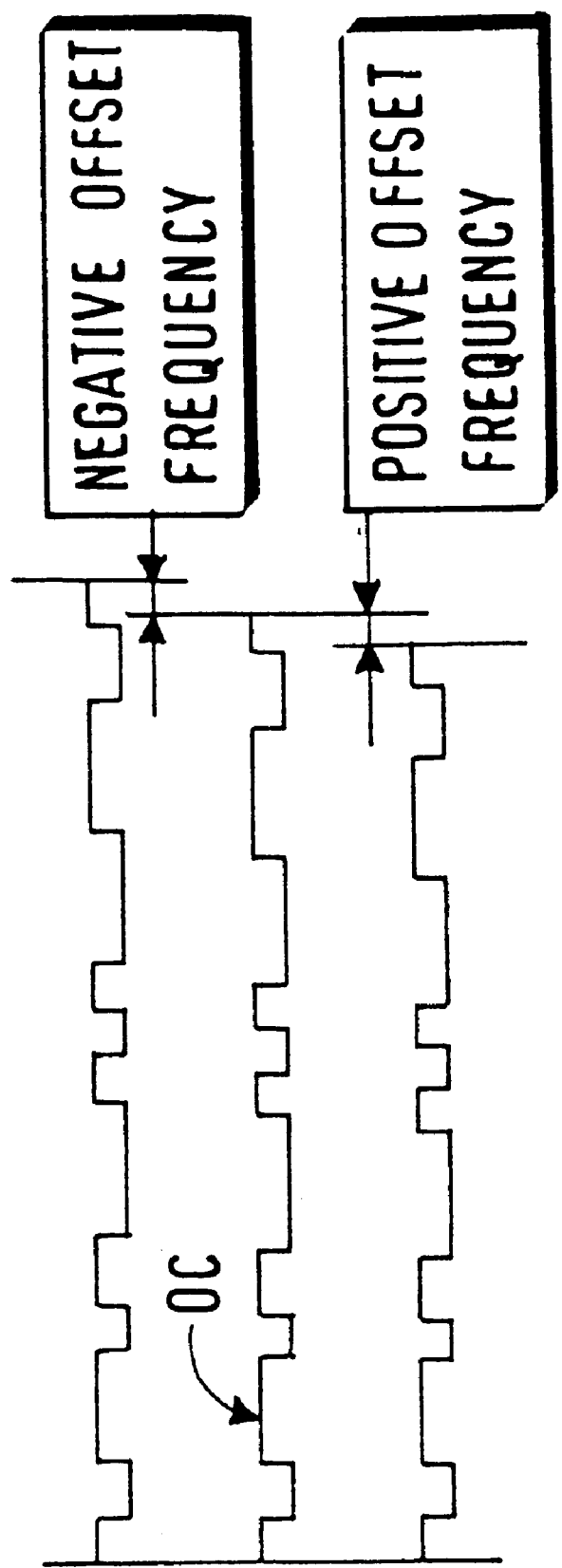

The principle of the code sliding is illustrated in FIG. 2. The middle line shows an example of original code OC, while the upper and lower lines show the same code but on which a frequency offset can be observed (the upper line corresponds to a code sliding due to a negative offset frequency and the lower one to a code sliding due to a positive offset frequency). This principle may be carried out for instance by means of a transmitter such as shown in FIG. 3. In a modulation stage of said transmitter, a data-to-frequency offset converter 31 (DFOC) controls a frequency synthesizer such as an oscillator 32, e.g. a numerically controlled oscillator (NCOS), the output of which is received by a code generator 33 (CGEN). According to the invention, the generator 33 is initialized by an initialization module 34 (INIT) each period of the transmitted pseudo-noise code (i.e. each data symbol). The output of said modulation stage is received by an up-converter 35 (UPCO) which translates said output to a frequency suitable for transmission.

Figure 4:
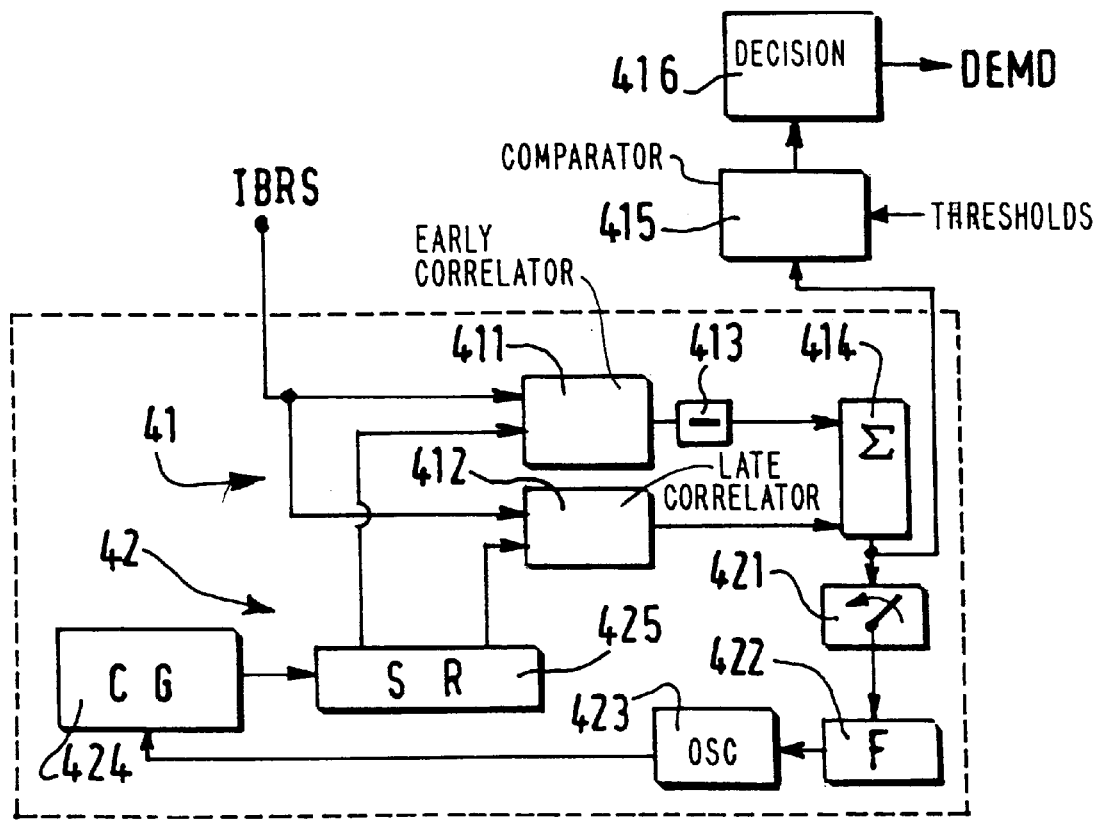
FIG. 4 illustrates the principle of demodulation in a CDMA receiver according to the invention.

Reciprocally, a receiver is provided for implement a subsequent down-conversion and demodulation process. In a receiver such as illustrated in FIG. 4, the base-band signal is received by a demodulation branch 41 to which is connected a calibration branch 42 during a so-called calibration step. In the described implementation, and in the case of a mapping principle (carried out at the transmitting side) for a two levels modulation, a frequency offset of a value $f_m$ (such that the code shift however does not exceed one chip during the correlation period of the receiver) has been added to the nominal pseudo-noise code frequency.

In the receiver of FIG. 4, the calibration branch 42, comprising in series a switch 421, a filter 422 (F), an oscillator 423 and a code generator 424 (CG) controlling a shift register 425 (SR) connected to the correlation part of the demodulation branch 41, is provided in order to solve the case of an unknown frequency offset induced for example by Doppler effect (due to the motion of the transmitter or the receiver). The switch 421 is in "open" position, except during the calibration step. If the transmitter periodically sends (each P code period(s), with P>1) one code period without any frequency offset, the calibration branch allows the receiver to detect right data in spite of such unknown offsets. The demodulation branch 41 comprises first and second correlators 411 and 412 receiving the input base band received signal. These correlators are controlled by the shift register 425 and followed by a comparison device (413, 414, 415) at the output of which a decision circuit 416 yields the demodulated data DEMD.

The table given hereunder is an example of the relation between the frequency offsets and the data for the two-level modulation here described:

| OF | ECOA | LCOA | DATA |
|---|---|---|---|
| + fm | α | ε | +1 |
| +2 fm | 2α | 2ε | +2 |
| – fm | ε | α | –1 |
| –2 fm | 2ε | 2α | –2 | in which OF designates the offset frequency, ECOA the early correlator output amplitude at the end of the correlation period, LCOA the late correlator output amplitude at the end of the correlation period, and $\epsilon \ll \alpha$.

Figure 5:
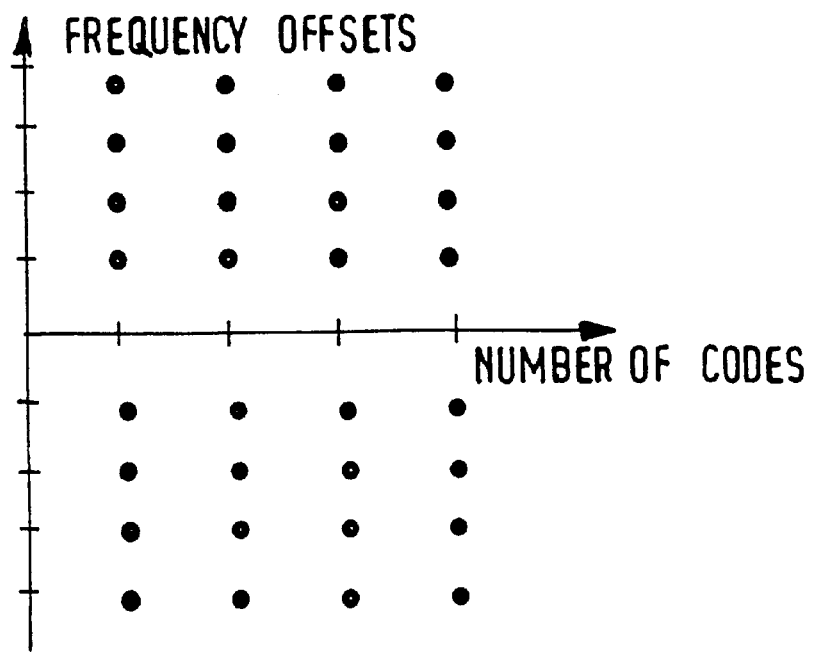
FIG. 5 shows an example of frequency offset and multi-code mapping.

The invention is by no means limited to the above-described implementation. It is clear, for instance, that in the modulation stage of the transmitter, multicode with different frequency offsets may also be used, as illustrated for instance in FIG. 5.

When a frequency offset of fm or 2fm has been added to the nominal pseudo-noise code frequency, the output amplitude of the first correlator 411 (also called early correlator) rises to a value α, for $f_m$, and to a value 2α, for $2f_m$. However, when subtracting $f_m$ or $2f_m$, the second correlator 412 (also called later correlator) sees its output amplitude rise to a value of α (for $-f_m$) or 2α (for $-2f_m$), which finally leads to the demodulated data indicated in the last column of the table (at the end of each correlation period, the difference between the late and the early correlation results, computed by means of the inverter 413 and the adder 414, is compared in the comparator 415 to predetermined thresholds the number of which depends on the number of data). According to the result of the decision then taken in the decision circuit 416, a double information may be extracted, as illustrated in the table: the sign of the difference and the amplitude, according to the levels of the thresholds (which in turn depend on the levels of the modulation that has been used).

It is therefore seen that a main feature of the invention is the possibility to transport more than one data bit information over a single period of the pseudo-noise code, which is not possible with the conventional direct sequence spread spectrum modulation (or DS-CDMA modulation) technique. This advantage can be obtained if enough signal-to-noise ratio is available. Moreover, under the same conditions, the acquisition process according to the invention is faster, compared to said DS-CDMA modulation technique, owing to the presence, in said known technique, of data amplitude modulation, which leads to situations where the code synchronizing processor continues the search for the code synchronization although said synchronization is already achieved. Such situations increase the probability of missing detection and lead to a longer acquisition time, with respect to the case of the invention that does not suffer from that problem since no data amplitude modulation is applied.

What is claimed is:

1. A code division multiple access transmitter comprising a modulation stage followed by an up-converter, characterized in that
    the modulation stage comprises in series at least a data-to-frequency offset converter, a frequency synthesizer controlled by the data to frequency offset converter and a code generator, and
    the code generator is periodically initialized by an initialization module by means of which at least one code period without any frequency offset is provided each P code periods.

2. A code division multiple access transmitter according to claim 1, wherein, in the modulation stage, multi-code with different frequency offsets is used.

3. A code division multiple access receiver comprising a down converter followed by a demodulation stage, characterized in that
    the demodulation stage receives a modulated signal that has been modulated by a modulation stage, comprising at least a data-to-frequency offset converter, a frequency synthesizer controlled by said converter and a code generator, and
    the demodulation stage comprises a demodulation branch and calibration branch,
    the demodulation branch comprises
        one or more correlators that are configured to detect frequency offsets in the modulated signal, and
        a decoder that is configured to provide corresponding demodulated data based on the detected frequency offsets, and
    the calibration branch is configured to provide a periodic frequency control to a reference code generator of the receiver before data demodulation.

4. A code division multiple access receiver according to claim 3, characterized in that, for frequency offsets $f_m$ and $2f_m$ in the modulated signal, demodulated data are obtained according to a corresponding phase and amplitude of output signals of the one or more correlators.

* * * * *